(12) United States Patent
Flora et al.

(10) Patent No.: US 7,856,475 B1
(45) Date of Patent: Dec. 21, 2010

(54) METHOD AND SYSTEM FOR FACILITATING COMMUNICATION BETWEEN USERS

(75) Inventors: John Reed Flora, Pleasanton, CA (US); Shahid Ahmed, Bangalore (IN)

(73) Assignee: Intuit Inc., Mountain View, CA (US)

( * ) Notice: Subject to any disclaimer, the term of this patent is extended or adjusted under 35 U.S.C. 154(b) by 226 days.

(21) Appl. No.: 12/023,641

(22) Filed: Jan. 31, 2008

(51) Int. Cl.
*G06F 15/16* (2006.01)

(52) U.S. Cl. .................. 709/205; 709/204; 709/206; 709/207

(58) Field of Classification Search .......... 709/204–207
See application file for complete search history.

(56) References Cited

U.S. PATENT DOCUMENTS 7,533,145 B1 * 5/2009 Greenspan et al. ........... 709/204
2006/0031331 A1 * 2/2006 LoBuono et al. ............. 709/206
2007/0174404 A1 * 7/2007 Hui et al. .................... 709/207
2007/0266088 A1 * 11/2007 Wu et al. .................... 709/204

* cited by examiner

*Primary Examiner*—George C Neurauter, Jr.
*Assistant Examiner*—Clarence John
(74) *Attorney, Agent, or Firm*—Osha • Liang LLP

(57) ABSTRACT

The invention relates to a method for facilitating communication between users. The method involves capturing a dialogue between the users; analyzing the dialogue to determine a usage pattern; selecting a communication tool, based on the usage pattern, that is suitable for a communication subsequent to the dialogue; informing the plurality of users of the communication tool suitable for the communication subsequent to the dialogue; and generating a summary of the communication subsequent to the dialogue.

25 Claims, 7 Drawing Sheets

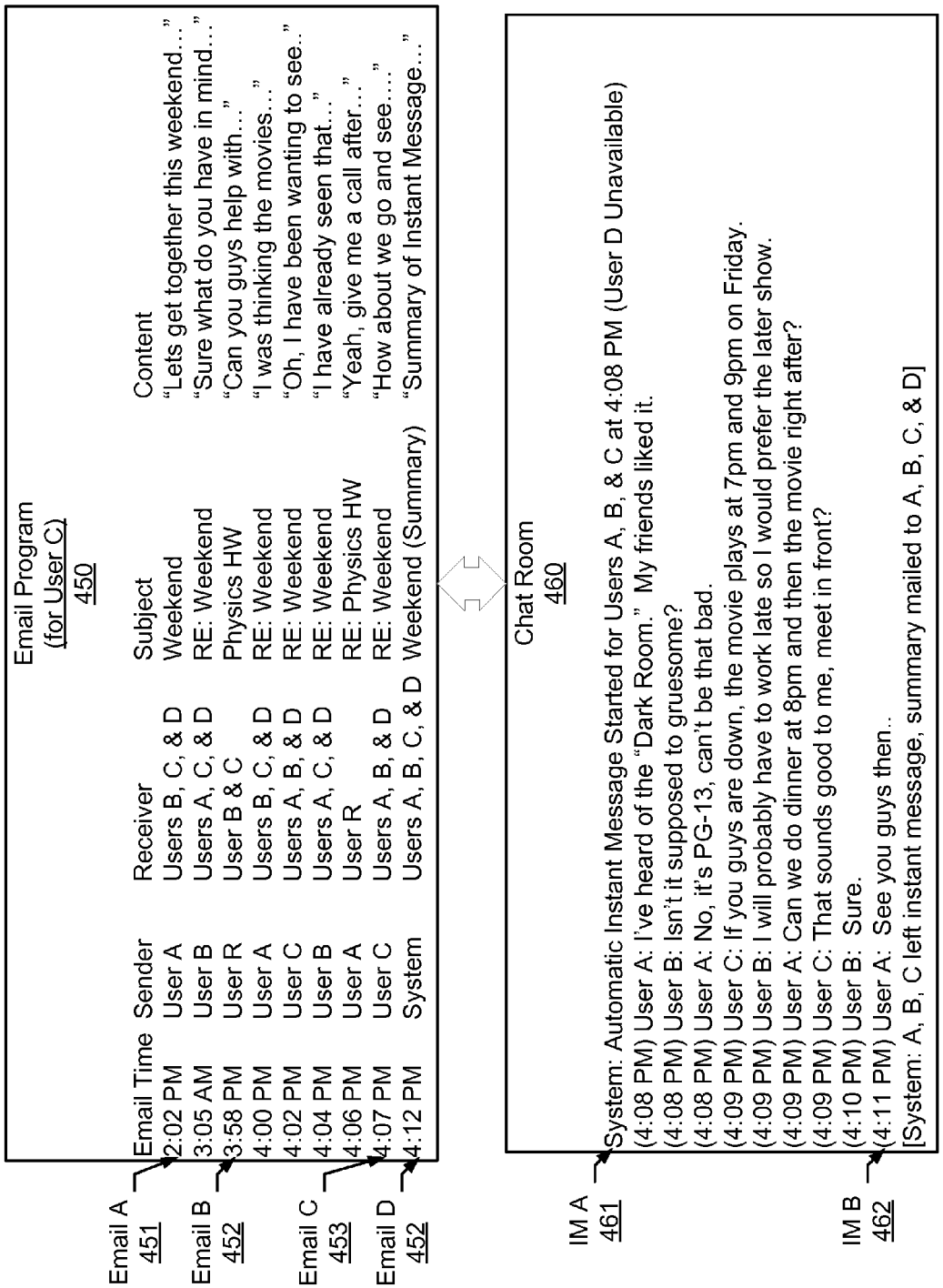

METHOD AND SYSTEM FOR FACILITATING COMMUNICATION BETWEEN USERS

BACKGROUND OF INVENTION

Today, many different communication tools are available for users in a network to communicate with one another. Communication tools allow a user to convey one or more messages to one or more users. Communication tools may be visual, audible, and/or a combination of both. Examples of communication tools include, but are not limited to, postal mail, electronic messaging (email), instant messaging, chat rooms, text messaging, telephone calls, teleconferencing, videoconferencing, document sharing tools, file transfer tools, or any other tool used for communicating a message.

Each communication tool has features or functionality that makes the tool suitable for different types of communication. For example, some communication tools may be used to convey a message rapidly, whereas, other communication tools, although not as fast, may provide reliability and/or a delivery guarantee. In addition, some communication tools require users on the transmitting and receiving ends to be available concurrently to be able to convey the message while other communication tools may be able to communicate messages without the transmitting and receiving parties being concurrently available.

In general, a user initiating the communication selects a communication tool to convey a message based on some criteria (e.g., subject matter of dialogue, availability of recipients, speed of delivery, delivery guarantee, urgency of delivery, available time for dialogue, available communication tools, knowledge of communication tools, efficiency of dialogue, or any other criteria deemed important by the user). In response to receiving one or more messages, a recipient generally responds back using the same communication tool. As messages are sent back and forth, users generate a dialogue using the communication tool initially selected by the original user. However, the communication tool selected by the user may not be suitable for the dialogue between the users.

SUMMARY OF INVENTION

In general, in one aspect, the invention relates to a method for facilitating communication between users. The method includes capturing a dialogue between the plurality of users; analyzing the dialogue to determine a usage pattern; selecting a communication tool, based on the usage pattern, that is suitable for a communication subsequent to the dialogue; informing the users of the communication tool suitable for the communication subsequent to the dialogue; and generating a summary of the communication subsequent to the dialogue.

In general, in one aspect, the invention relates to a method for communicating between users. The method includes selecting a first communication tool for a dialogue between the plurality of users, wherein the dialogue is analyzed to determine a usage pattern; switching to a second communication tool for a communication subsequent to the dialogue, where the second communication tool is selected based on the usage pattern; and obtaining a summary of the communication subsequent to the dialogue.

In general, in one aspect, the invention relates to a system for facilitating communication between users. The system includes a data repository including a dialogue between the users using at least one of the communication tools; a communication engine including functionality to: analyze the dialogue between the users to determine a usage pattern; select a communication tool of the communication tools suitable for a communication subsequent to the dialogue based on the usage pattern; inform the users of the communication tool suitable for the communication subsequent to the dialogue; and generate a summary of the communication subsequent to the dialogue.

In general, in one aspect, the invention relates to a computer readable medium comprising instructions for facilitating communication between a plurality of users, the instructions comprising functionality for: capturing a dialogue between the plurality of users; analyzing the dialogue to determine a usage pattern; selecting a communication tool, based on the usage pattern, that is suitable for a communication subsequent to the dialogue; informing the plurality of users of the communication tool suitable for the communication subsequent to the dialogue; and generating a summary of the communication subsequent to the dialogue.

Other aspects and advantages of the invention will be apparent from the following description and the appended claims.

BRIEF DESCRIPTION OF DRAWINGS

FIGS. 4A-4C show an example in accordance with one or more embodiments of the invention.

DETAILED DESCRIPTION

Figure 1:
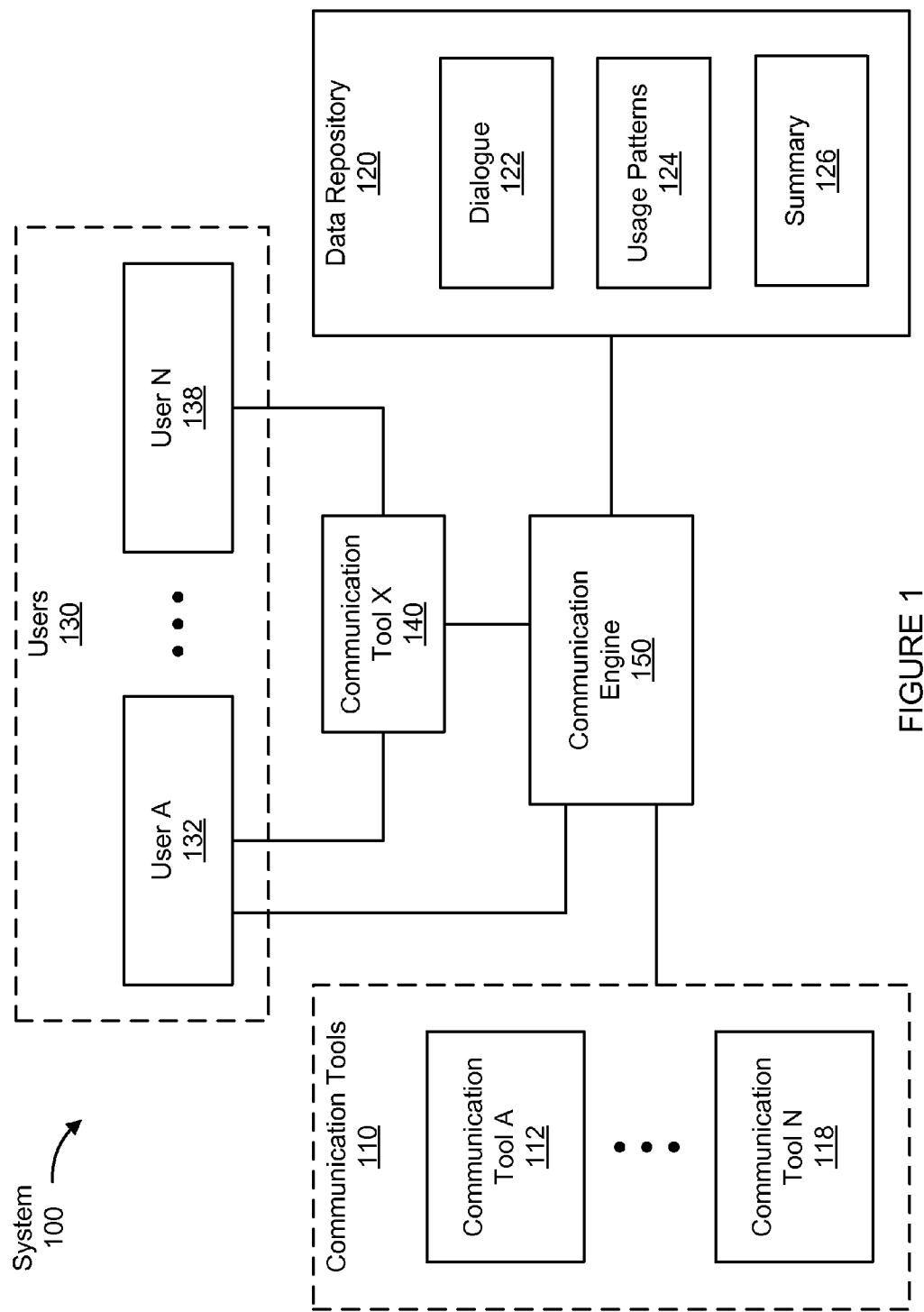
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for facilitating communication between users. Specifically, embodiments of the invention provide a method and system for obtaining a dialogue between the users, identify a usage pattern in the dialogue, and selecting a communication tool suitable for communication subsequent to the dialogue, based on the usage pattern, between the users. Further, the dialogue may be generated and/or obtained by one or more persons, including one or more participants in the dialogue.

FIG. 1 shows a system (100) in accordance with one or more embodiments of the invention. As shown in FIG. 1, the system (100) includes one or more communication tools (110), a data repository (120), a 'selected' communication tool X (140), and a communication engine (150). Each of these components are described below and may be located on the same computing device (e.g., a server, mainframe, desktop personal computer (PC), laptop, personal desktop assistant (PDA), television, cable box, satellite box, kiosk, telephone, mobile phone, or other computing devices) or may be located on separate computing devices coupled by a network (e.g., Internet, Intranet, Extranet, Local Area Network (LAN), Wide Area Network (WAN), or other network communication methods), with wired and/or wireless segments.

In one or more embodiments of the invention, the system (100) is implemented using a client-server topology. The system (100) itself may be an enterprise application running on one or more servers, and in some embodiments could be a peer-to-peer system, or resident upon a single computing system. In addition, the system (100) is accessible from other machines using one or more interfaces (not shown). In one or more embodiments of the invention, the system (100) is accessible over a network connection (not shown), such as the Internet, by one or more users. Information and/or services provided by the system (100) may also be stored and accessed over the network connection.

Continuing with FIG. 1, in one or more embodiments of the invention, the communication tools (110) (e.g., communication tool A (112) and communication tool N (118)) are messaging mechanisms that may be used by users (130) (e.g., user A (132) and user N (138)) to convey one or more messages during communication with one another. The communication tools (110) may be used to convey messages intra-network and/or inter-network and may be implemented using one or more mediums (e.g., phone lines, data lines, etc.). Different communication tools (110), as described above, may be suitable for different kinds of communication between the users (130). For example, one communication tool may be a non-secure general electronic messaging application, and another communication tool may be a high-security encrypted electronic messaging application. Each communication tool may be a different software application, and/or may be a different messaging mechanism in a single software application. For example, a single web based application may provide electronic messaging and instant messaging as two different types of communication tools. Different communication tools (110) may also be particular messaging mechanisms with different attributes (or features) activated or deactivated. For example, one communication tool may be instant messaging without video and a second communication tool may be instant messaging with video.

In one or more embodiments of the invention the data repository (120) is a data storage device that includes functionality to store at least the dialogue (122), the usage patterns (124), and the summary (126). In one or more embodiments of the invention, access to the data repository (120) is restricted and/or secured. As such, access to the data repository (120) may require authentication using passwords, secret questions, personal identification numbers (PINs), biometrics, and/or any other suitable authentication mechanism. Those skilled in the art will appreciate that elements or various portions of data stored in the data repository (120) may be distributed and stored in multiple data repositories. In one or more embodiments of the invention, the data repository (120) is flat, hierarchical, network based, relational, dimensional, object modeled, or structured otherwise. For example, the data repository may be maintained as a table of a SQL database. In addition, data in the data repository (120) may be verified against data stored in other repositories.

Continuing with FIG. 1, in one or more embodiments of the invention, the dialogue (122) shown as stored in the data repository (120), is a set of verbal or written messages that are communicated between two or more users (130) using a user-selected communication tool. For example, the dialogue may include messages between three users and/or may include messages between a first user and a second user and also messages between a first user and a third user. Accordingly, different portions of the dialogue (122) may include different subgroups of users (130).

The dialogue (122) may be stored as text in a single file (e.g., text of messages in an instant message session), multiple files (e.g., a copy of each email sent in the dialogue), organized into a database, or stored in any organized manner. In one or more embodiments of the invention, a group of messages may be recognized as a dialogue (122) if the messages include a similar group of users (130), a similar subject line (e.g., subject line of an email), and/or other attribute(s) that indicate relatedness to one another. In one or more embodiments of the invention, messages that are part of a same chain of messages may be recognized as a dialogue (122). For example, a message reply or a message forward is part of the same chain of messages that is recognized as a dialogue (as identified by appropriate characteristics of the message(s)). Another example of a set of messages recognized as a dialogue may involve back and forth text messages between two cellular phones (as identified by a distinct phone or device number).

In one or more embodiments of the invention, the usage patterns (124) include one or more pre-defined patterns that may occur in a dialogue (e.g., dialogue (122)) between the users (130). Different types of usage patterns (124) may be predefined by an entity (e.g., a programmer, a system administrator, a user (132), a software application or any other suitable entity), in accordance with one or more embodiments of the invention.

The usage patterns (124) may be based on timing, content (including message attachments), users involved, and/or any other attributes associated with a dialogue (122) between the users (130). A usage pattern based on timing may be related to the frequency of different messages in a dialogue. For example, three or more messages in less than ten minutes may be a usage pattern. Furthermore, in one or more embodiments of the invention, a usage pattern based on timing may be related to the time of day messages are sent. For example, four or more messages in less than ten minutes between 8 am and 5 pm (i.e., a standard work day when messages are regularly sent) may be pre-defined as a usage pattern, whereas four or more messages in less than twenty minutes after 5 pm (i.e., after a standard work day when messages are irregularly sent) may not be pre-defined as a usage pattern. A usage pattern based on content may be related to patterns of confidential content, high-security content, inappropriate content, or sensitive content in a dialogue may be defined as a content pattern. Another usage pattern based on content may be related to a pattern of message attachments. For example, different versions of a single file sent back and forth between multiple users may be recognized as a content pattern related to message attachments. In one or more embodiments of the invention, a particular length and/or complexity of the content may be also defined as a content pattern. For example, a message having an entire page length of text in an instant message may be recognized as a usage pattern.

In one or more embodiments of the invention, the usage patterns (124) may be customized for different users and/or different communication tools. For example, in a dialogue between employees at a fifteen-person company, a single instant message by the chief executive officer may be pre-defined as a usage pattern. In one or more embodiments of the invention, the usage patterns (124) may be associated with one or more suitable communication tools (110). For example, a usage pattern that includes frequent messages (i.e., a high number of messages in a short period of time) may be associated with a communication tool that provides instant delivery of the messages (e.g., instant messaging). In another example, a highly confidential content usage pattern may be associated with a highly secure and encrypted communication tool.

Continuing with FIG. 1, in one or more embodiments of the invention, the summary (126) is text related to at least a portion of the messages between different users (130). The summary (126) may include all the messages, a filtered selection of the messages, a paraphrase of the messages, a brief synopsis of the messages, or other suitable modification of the messages. Further, each of the filtered selections may be dynamically expanded or contracted. For example, the brief synopsis of the message may be set to a default setting where only two lines of text are shown. With a user modification of the setting, the brief synopsis may be expanded to show three lines of text or contacted to show only one line of text.

In one or more embodiments of the invention, the summary (126) may only include messages from particular users of all the users that sent messages. Further, the summary (126) may be limited to messages that are sent using a communication tool (140) that was selected based on a usage pattern (124) in the dialogue (122) between the users (130). The summary (12) may also be related to messages within the dialogue (122) itself that were sent using a user-selected communication tool (140).

Continuing with FIG. 1, in one or more embodiments of the invention, the communication engine (150) may be a process, program, or system that includes functionality to obtain a list of the messages in a dialogue (122) by monitoring dialogue (122) between the users (130). This monitoring may be continuous or at some periodic (and/or intermittent) frequency deemed appropriate for the particular communication tool(s) being used. For example, a server used for electronic messages may be monitored every second and the dialogue (122) is immediately captured. In another embodiment of the invention, the communication engine (150) may periodically (and/or intermittently) receive messages exchanged between users from an application and/or communication tool (110) being used by the users (130).

In one or more embodiments of the invention, the communication engine (150) may include functionality to analyze the dialogue (122) to determine the timing, the content, the users involved, and/or any other relevant attributes to identify a usage pattern in the dialogue (122). For example, the communication engine (150) may include functionality to do a keyword search of all the messages to determine if the results match a content-related usage pattern. The communication engine (150) may also include functionality to identify the sender of each message to determine whether a user-specific usage pattern (124) is found in the dialogue (122). The communication engine (150) may include functionality to calculate the time difference between messages in a dialogue (122) and determine whether a frequency related usage pattern (124) is found in the dialogue (122).

In one or more embodiments of the invention, the communication engine (150) includes functionality to select a communication tool X (140) from the communication tools (110), based on the usage pattern (124), that is suitable for continuing the communication between the users (130). In one or more embodiments of the invention, the usage patterns (124) and the communication tools (110) may each be associated with one or more attributes (e.g., high security, fast delivery, large content, etc.), and the communication engine (150) may include functionality to select the best match between the usage pattern (124) and the communication tools (110). In another embodiment of the invention, each usage pattern (124) may be associated with a specific communication tool (110) and accordingly, based on the usage pattern (124) of the dialogue (122) the communication engine (150) may easily be able to identify an associated communication tool (i.e., communication tool X (140) that is suitable for communication subsequent to the dialogue (122).

In one or more embodiments of the invention, the communication tool X (140) may be one or more communication tools (110) that are selected by the communication engine (150) for communication between one or more subgroups of the users (130), subsequent to the dialogue (122). For example, in an electronic messaging dialogue between three users, where two of the users are online and one of the users is simply a recipient without actually being online, the communication tool X may, in fact, correspond to two communication tools. The first communication tool may be instant messaging between the two online users, and the second communication tool may be the electronic messaging between the three users that is already being used. In another embodiment of the invention, a single communication tool may also be selected for all users involved in a dialogue (122). In one or more embodiments of the invention, the communication engine (150) may include functionality to automatically switch to a selected communication tool X (140) for communication subsequent to the dialogue, may prompt the users (130) prior to switching to communication tool X (140), and/or may simply inform the users (130) of the communication tool X (140) that is suitable for subsequent communication based on the usage pattern (124).

In one or more embodiments of the invention, the communication tool X (140) may be used by the users (130) using one or more user interfaces (not shown). The user interface may be a web interface, a graphical user interface (GUI), a command line interface, an application interface or any other suitable interface. The interface may also include one or more web pages that can be accessed from a computer with a web browser and/or internet connection. Alternatively, the interface may be an application that resides on a computing system, such as a personal computer (PC), a mobile device (e.g., a cell phone, pager, digital music player, or mobile media center), a personal digital assistant (PDA), and/or other computing devices of the users (130), and that communicates with the system (100) via one or more network connections and protocols.

In one or more embodiments of the invention, messages exchanged using the communication tool X (140) may be provided by the communication engine (150) to one or more of the users (150). The communication engine (150) may provide a copy of the messages exchanged using the selected communication tool X (140) and/or the summary (126) to all of the users. In another embodiment of the invention, the communication engine (150) may include functionality to send messages and/or a summary (126) to a subgroup of the users (130) that were involved in the dialogue (122), however, were not involved in the communication using the communication tool X (140), subsequent to the dialogue (122).

Figure 2:
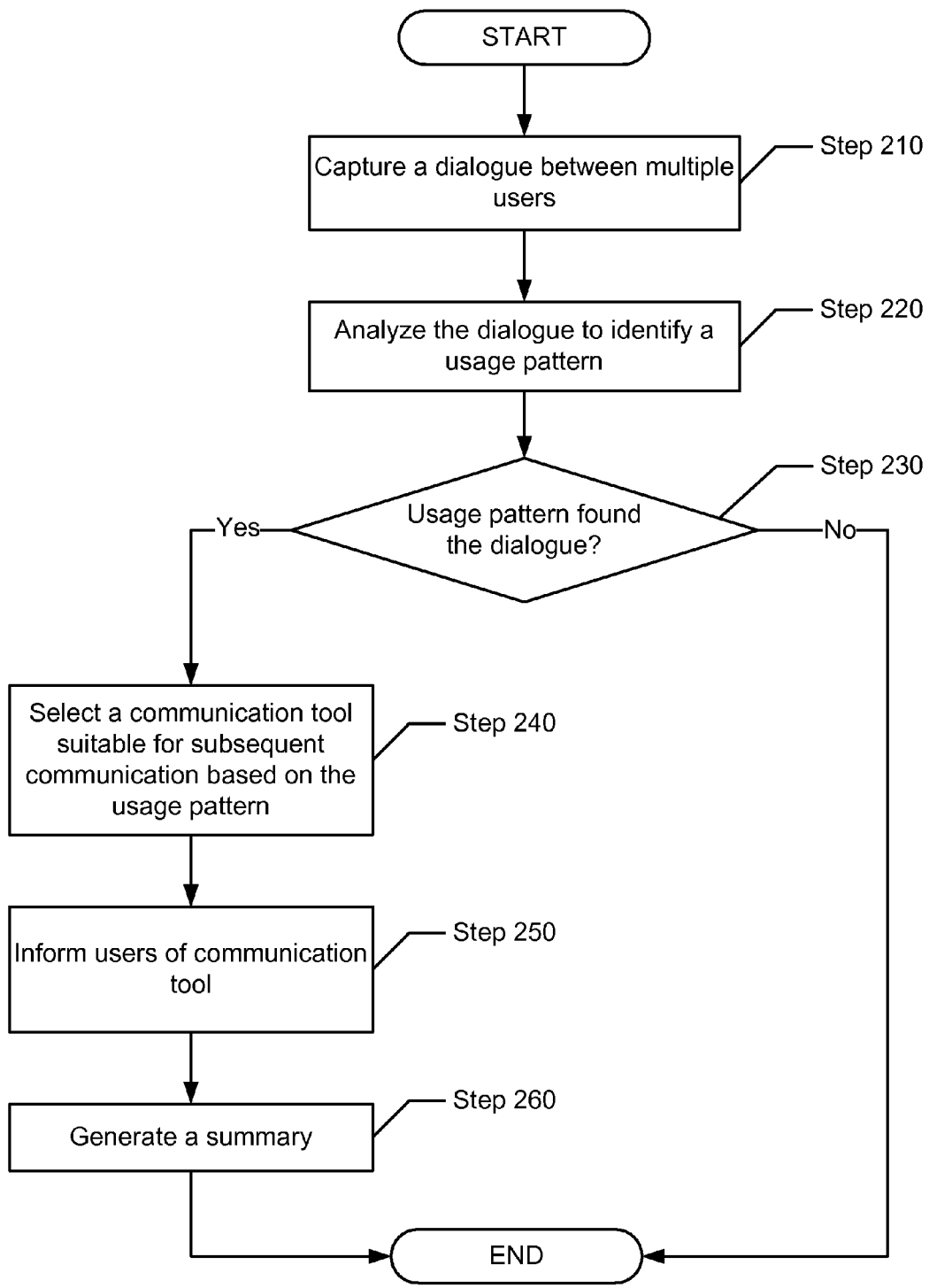
FIGS. 2 and 3 show flow charts in accordance with one or more embodiments of the invention.
Figure 3:
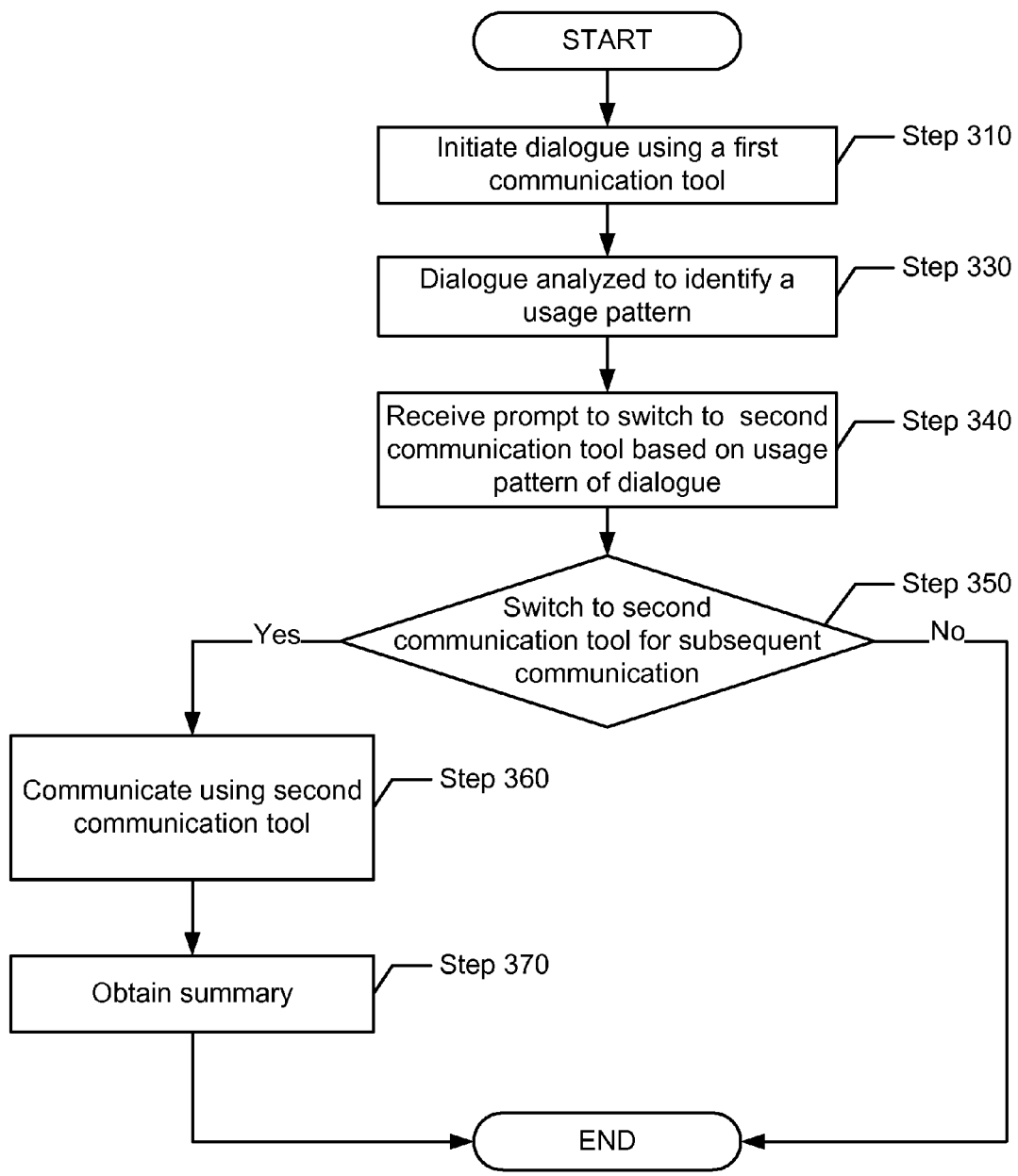

FIGS. 2 and 3 show flow charts in accordance with one or more embodiments of the invention. In one or more embodiments of the invention, one or more of the steps described below may be omitted, repeated, and/or performed in a different order or concurrently. Accordingly, the specific arrangement of steps shown in FIGS. 2 and 3 should not be construed as limiting the scope of the invention.

Specifically, FIG. 2 shows a flow chart for facilitating communication between groups of users. Initially, a dialogue between multiple users is captured, in accordance with one or more embodiments of the invention (Step 210). The dialogue may be passively captured by receiving the dialogue from any process, program, or software application. In addition, the dialogue may be obtained by periodically querying a database, or an application for the dialogue between users. In one or more embodiments of the invention, messages between users may be continuously monitored and captured as dialogue in real time. For example, each message sent or received from a monitored user may be captured. Or, an email server may be monitored for messages between groups of users.

Next, the captured dialogue is analyzed to identify a usage pattern, in accordance with one or more embodiments of the invention (Step 220). The analysis may include an analysis of the content, the timing, the users, or any other attributes of the dialogue. In one or more embodiments of the invention, usage patterns are determined by comparing attributes of the captured dialogue with pre-defined usage patterns to identify a match. For example, the time difference between messages in the dialogue may be compared to pre-defined usage patterns to identify a match. Or, a portion of the dialogue associated with a particular user (e.g., messages sent and/or received by the user) may be checked for usage patterns associated with the particular user. Accordingly, a determination is made whether there any usage patterns are present in the dialogue (Step 230).

If a usage pattern is found, a communication tool associated with the usage pattern is selected for subsequent communication between the users (Step 240). In one or more embodiments of the invention, multiple usage patterns may be found in a dialogue and accordingly, multiple communication tools may be associated with the usage patterns in the dialogue. In this case, a single communication tool may be selected using an appropriate selection mechanism or multiple communication tools may be selected for communication between different subgroups of users. For example, if multiple communication tools are found to be suitable, the communication tools may be ranked and the highest ranked communication tool may be selected. In addition, a selected communication tool may be modified by activating or deactivating particular features to customize the communication tool to the multiple usage patterns. For example, if a high message frequency pattern (i.e., suitable for instant messaging) and a high confidentiality pattern (i.e., suitable for an encrypted secure communication tool) are found in a dialogue, an instant messaging tool with encryption enabled may be selected.

In accordance with one or more embodiments of the invention, the users (or a relevant subgroup of users) are then informed of the selected communication tool(s) (Step 250). Informing the users of the communication tool may involve simply notifying the users of the suitable communication tool(s), providing an option for the users to switch to a selected communication tool, and/or automatically switching the users to the selected communication tool. For example, as soon as a suitable communication tool (i.e., different from the communication tool currently used by the users) is identified, one or more of the users may be presented with an appropriate prompt. The prompt may allow the users to switch to the suitable communication tool, or continue using the present communication tool. In addition, informing the users may involve modifying the communication tool currently being used to a suitable configuration for the communication. Accordingly, in one or more embodiments of the invention, one or more users may switch or be switched to a suitable communication tool(s).

Continuing with FIG. 2, in one or more embodiments of the invention, a summary of at least a portion of the communication between the users is generated (Step 260). The summary may be generated by simply copying or paraphrasing any portion of the communication. For example, all or a subgroup of messages that are exchanged between users are selected based on user, content, communication tool used or other suitable attribute may be copied or paraphrased to generate the summary. Another example involves summarizing the portion of the communication where the communication tool, selected in Step 240, was used. In another embodiment of the invention, the initial dialogue between the users prior to selecting the suitable communication tool in Step 240 may be summarized. Accordingly, in one or more embodiments of the invention, generating the summary may involve obtaining input from a user to identify which portions of the communication between users are to be summarized.

FIG. 3 shows a flow chart for communication between a plurality of users. Initially, a dialogue is initiated using a first communication tool, in accordance with one or more embodiments of the invention (Step 310). The dialogue may be initiated simply be sending and/or receiving a message using the first communication tool. For example, a dialogue using electronic messaging tool may be initiated by sending and/or receiving an electronic message. The dialogue may be initiated by a user with one or more other users.

Next, the dialogue created in Step 310 is analyzed to identify a usage pattern and select a second communication tool based on the usage pattern (Steps 330 and 340). Steps 330 and 340 are essentially the same as steps 220-240 shown in FIG. 2.

Once a usage pattern is identified based on the dialogue and a second communication tool suitable for the communication is selected, and a prompt is received to switch to the second communication tool (Step 340). In one or more embodiments of the invention, a notification may simply be received including information regarding a suitable communication tool, i.e., the second communication tool. In another embodiment of the invention, the communication between the users may automatically be switched to the second communication tool for subsequent communication (Step 350), without the use of a prompt that gives a user the option to switch communication tools. In one or more embodiments of the invention, switching to the second communication tool may involve modifying attributes of the first communication tool to make the first communication tool more suitable based on the usage pattern.

Next, the second communication tool is used for the communication subsequent to the dialogue (Step 360). In one or more embodiments of the invention, the second communication tool may be used by sending and/or receiving messages. Furthermore, at any point before or after the above described steps, a summary may be obtained in accordance with one or more embodiments of the invention (Step 370). The summary may be obtained automatically or by sending a request for the summary. In one or more embodiments of the invention, a portion of the communication between the users may be selected for the summary. For example, users, content, timing, and/or communication tool may be selected to find a corresponding communication and obtain a summary for the corresponding communication based on the selection. In one or more embodiments of the invention, the summary of messages exchanged using the second communication tool may be obtained as a message using the first communication tool. An example is further discussed below.

Figure 4A:
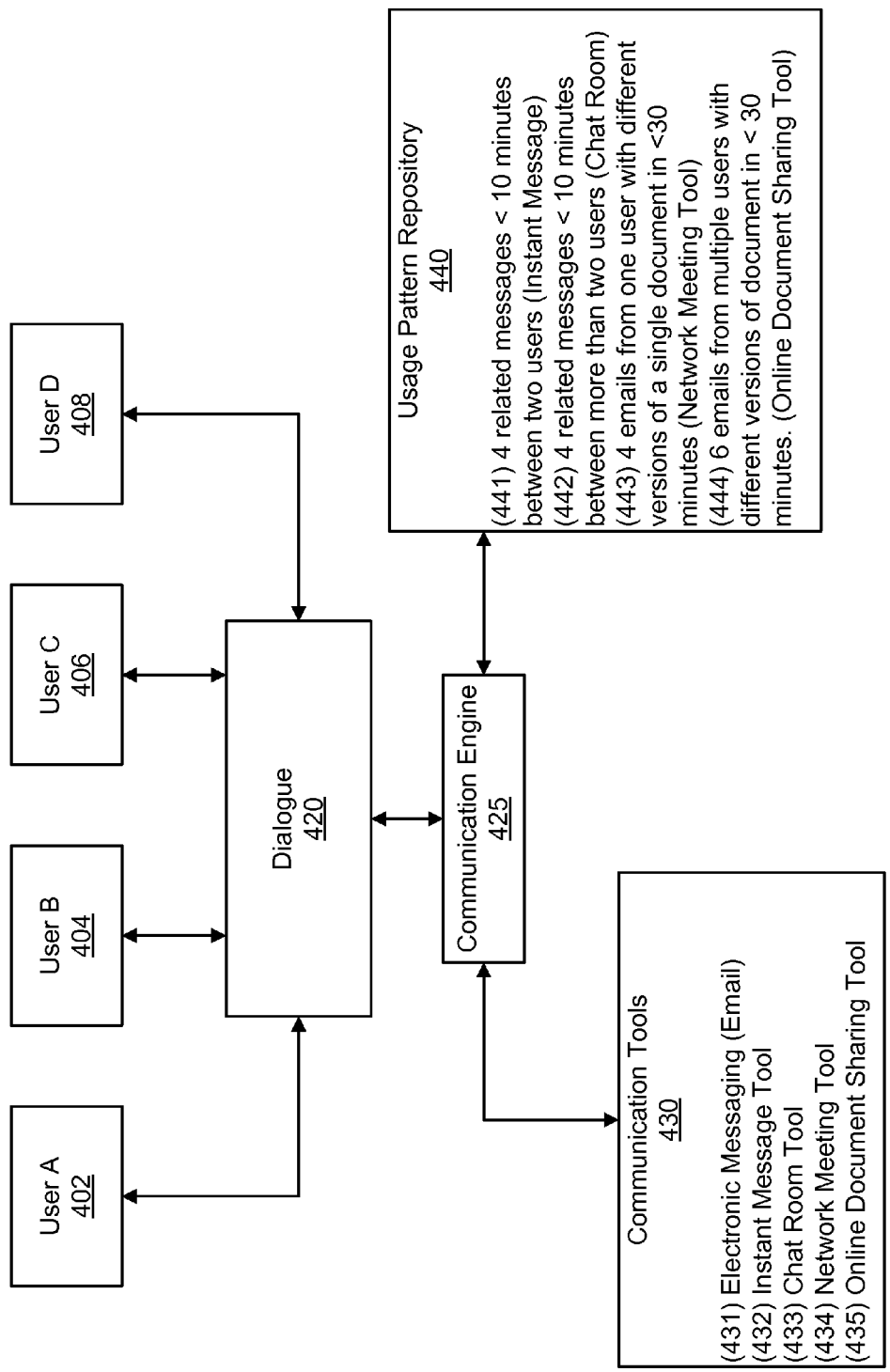
Figure 4B:
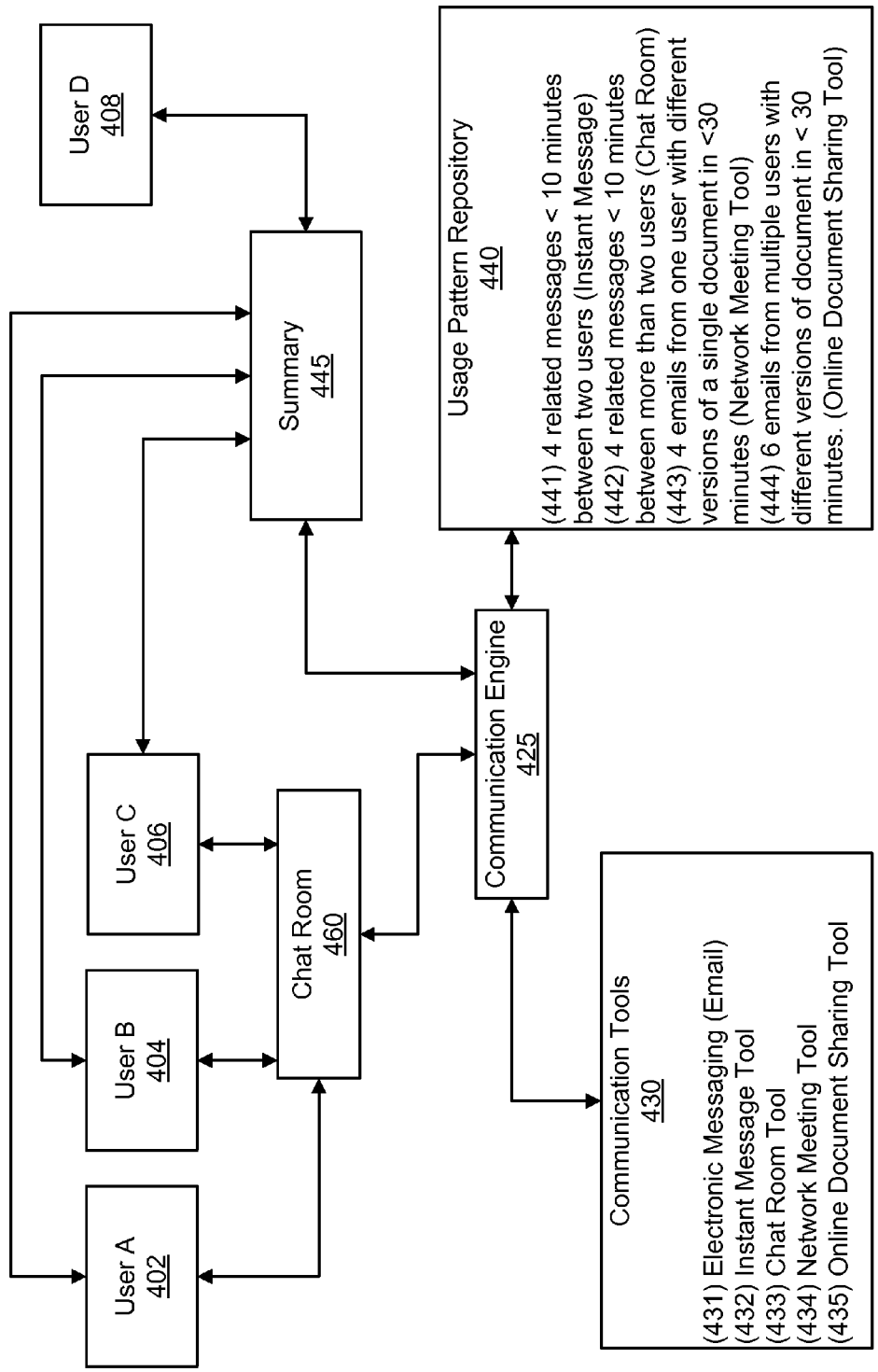

FIGS. 4A, 4B, and 4C show an example in accordance with one or more embodiments of the invention. Specifically, FIGS. 4A and 4B show interaction between different components within a communication system and FIG. 4C shows exemplary user interfaces (i.e., an email program of user C (450) and a chat room (460)) being used by user C (450)).

As shown in FIG. 4A, a communication system includes a usage pattern repository (440), communication tools (430), a communication engine (425), and a dialogue (420) between users (i.e., user A (402), user B (404), user C (406), and user D (408)). The communication tools (430) include the available communication tools (i.e., electronic messaging (431), an instant message tool (432), a chat room tool (433), a network meeting tool (434), and an online document sharing program (435)). The instant message tool (432) is a communication tool that enables users to send instant messages to each other. The chat room tool (433) may be any communication tool that essentially provides the same functionality as the instant message tool (432) with support for more than two users.

The usage pattern repository (440) includes a set of pre-defined usage patterns (e.g., (441)-(444)) and a suitable communication tool associated with each of the pre-defined usage patterns. For example, usage pattern (442) is four related emails exchanged between more than two users in less than ten minutes, and is associated with a chat room tool (i.e., chat room tool (433)).

The communication engine (425), which is essentially the same as the communication engine (150) shown in FIG. 1, monitors dialogue (420) between the users (i.e., user A (402), user B (404), user C (406), and user D (408)). In this example, the dialogue (420) is an email chain between the four users. This email chain is shown in detail in FIG. 4C within the email program (450) of user C (406). As shown in FIG. 4C, email A (451) was sent by user A (402) at 2:02 PM to user B (404), user C (406), and user D (408) initiating a dialogue regarding the weekend. As a result, a chain of related emails (i.e., dialogue) are exchanged between the users. Furthermore, user C also receives unrelated emails (e.g., email B (452) from user R (not shown)) that are not part of the dialogue. As the emails are exchanged, the communication engine (425) captures and analyzes the emails to detect the occurrence of a usage pattern in the usage pattern repository (440). After email C (453), the communication engine (425) determines that usage pattern (442) is detected. Specifically, emails sent at 4:00 PM, 4:02 PM, 4:04 PM, and 4:07 PM are related emails in less than ten minutes between more than two users.

Thereafter, as shown in FIG. 4B, the communication engine (425) automatically connects the available users (i.e., user A (402), user B (404), and user C (406)) in the chat room (460) because usage pattern (442) is associated with the chat room tool (433). The messages exchanged in the chat room (460) are shown in FIG. 4C, as the users finalize plans for the weekend. The system may send an initial message (i.e., IM A (461)), informing the users that the chat room has been automatically started. Furthermore, after the last instant message B (462), the communication engine (425) generates a summary (445), shown in FIG. 4B and provides the summary to user A (402), user B (404), user C (406), and user D (408) in email D (452). In this example, the summary may include all the messages exchanged in the chat room (460) or may simply include the final plans of meeting on Friday for dinner at 8 pm and a movie at 9 pm.

Figure 5:
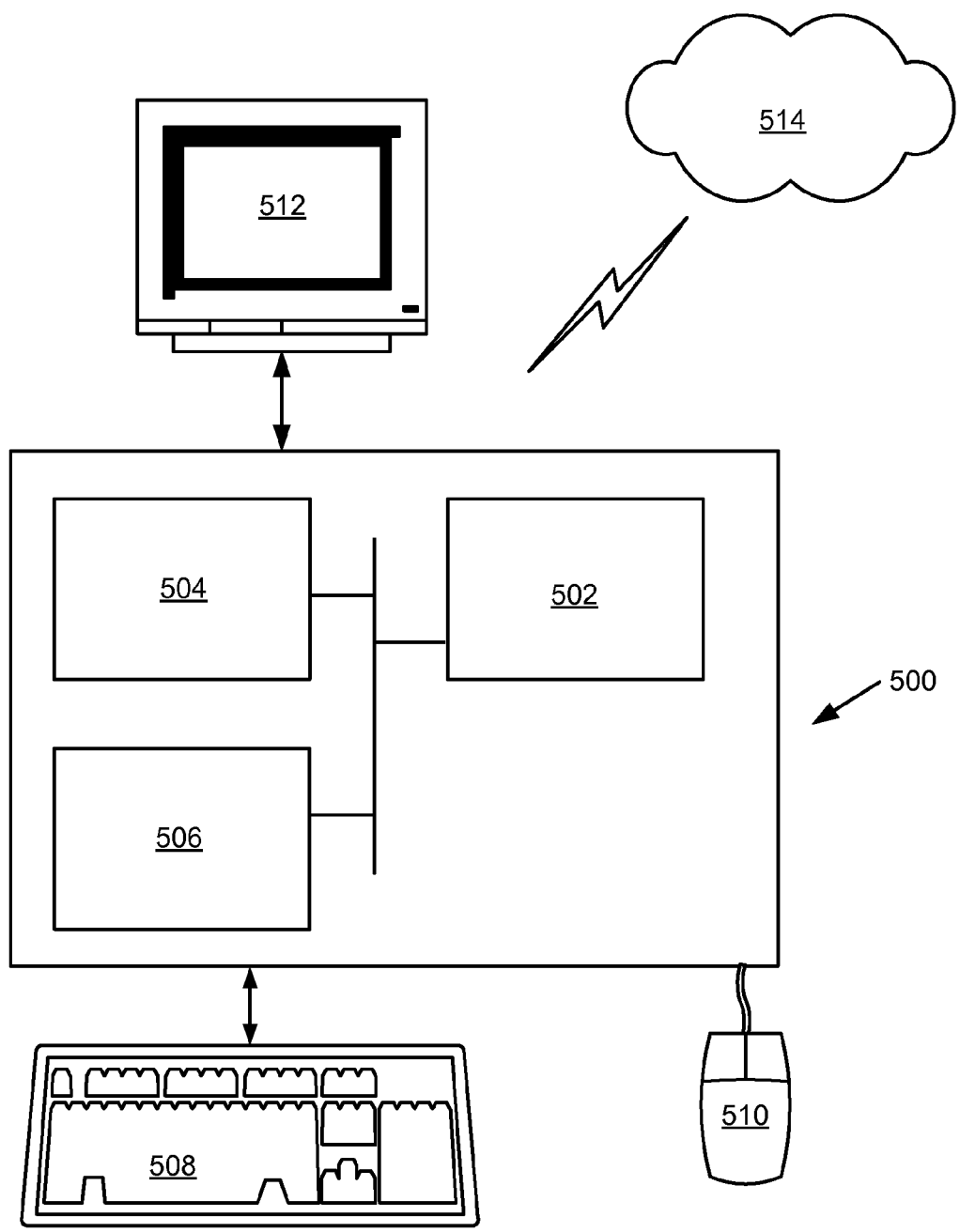
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a LAN or a WAN (e.g., the Internet) (514) via a network interface connection. Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention may be located on a different node within the distributed system. In one embodiment of the invention, the node is a computer system. Alternatively, the node may be a processor with associated physical memory. The node may alternatively be a processor with shared memory and/or resources. Further, software instructions to perform embodiments of the invention may be stored on a non-transitory computer readable medium such as a compact disc (CD), a diskette, a tape, or any other non-transitory computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for facilitating communication between a plurality of users, comprising:
   capturing, by a hardware processor, a first portion of a dialogue, between the plurality of users on a first communication tool, comprising a first version of a document and a first duration;
   capturing, by the hardware processor, a second portion of the dialogue, between the plurality of users on the first communication tool, comprising a second version of the document and a second duration;
   determining, by the hardware processor, that a number of document versions in the dialogue exceeds a document version threshold based on the first version and the second version;
   determining, by the hardware processor, that a frequency of the dialogue exceeds a frequency threshold based on the first duration and the second duration;
   identifying, by the hardware processor, a pre-defined usage pattern that exists prior to the dialogue based on the number of document versions in the dialogue exceeding the document version threshold and the frequency of the dialogue exceeding the frequency threshold;
   identifying, by the hardware processor, a second communication tool associated with the pre-defined usage pattern, wherein the first communication tool and the second communication tool are software applications;
   informing, by the hardware processor, the plurality of users of the second communication tool for a communication subsequent to the dialogue;
   switching, by the hardware processor, from the first communication tool to the second communication tool after informing the plurality of users; and
   generating, by the hardware processor, a summary of the communication subsequent to the dialogue.

2. The method of claim 1, wherein a subgroup of the plurality of users uses the second communication tool for the communication subsequent to the dialogue.

3. The method of claim 2, wherein the first communication tool is email, and wherein the second communication tool is instant messaging.

4. The method of claim 1, wherein the pre-defined usage pattern comprises a time delay pattern between messages in the dialogue.

5. The method of claim 1, wherein the pre-defined usage pattern comprises a document attachment pattern between messages in the dialogue.

6. The method of claim 1, further comprising:
provinding the summary comprising a filtered selection of messages to a user of the plurality of users.

7. The method of claim 6, wherein the summary is provided to the user during use of the first communication tool.

8. The method of claim 1, wherein subsequent to informing the plurality of users of the second communication tool:
a first user of the plurality of users communicates with a second user of the plurality of users using the first communication tool; and
the first user of the plurality of users communicates with a third user of the plurality of users using the second communication tool.

9. A system for facilitating communication between a plurality of users, comprising:
a hardware processor;
a data repository storing a dialogue between the plurality of users using a first communication tool; and
a communication engine, executing on the hardware processor, and comprising functionality to:
capture a first portion of a dialogue, between the plurality of users on a first communication tool, comprising a first version of a document and a first duration;
capture a second portion of the dialogue, between the plurality of users on the first communication tool, comprising a second version of the document and a second duration;
determine that a number of document versions in the dialogue exceeds a document version threshold based on the first version and the second version;
determine that a frequency of the dialogue exceeds a frequency threshold based on the first duration and the second duration;
identify a pre-defined usage pattern that exists prior to the dialogue based on the number of document versions in the dialogue exceeding the document version threshold and the frequency of the dialogue exceeding the frequency threshold;
identify a second communication tool associated with the pre-defined usage pattern, wherein the first communication tool and the second communication tool are software applications;
inform the plurality of users of the second communication tool for a communication subsequent to the dialogue;
switch from the first communication tool to the second communication tool after informing the plurality of users; and
generate a summary of the communication subsequent to the dialogue.

10. The system of claim 9, wherein a subgroup of the plurality of users uses the second communication tool for the communication subsequent to the dialogue.

11. The system of claim 10, wherein the first communication tool is email, and wherein the second communication tool is instant messaging.

12. The system of claim 9, wherein the pre-defined usage pattern comprises a time delay pattern between different messages in the dialogue.

13. The system of claim 9, wherein the pre-defined usage pattern comprises a document attachment pattern between different messages in the dialogue.

14. A non-transitory computer readable storage medium comprising instructions for facilitating communication between a plurality of users, the instructions comprising functionality for:
capturing a first portion of a dialogue, between the plurality of users on a first communication tool, comprising a first version of a document and a first duration;
capturing a second portion of the dialogue, between the plurality of users on the first communication tool, comprising a second version of the document and a second duration;
determining that a number of document versions in the dialogue exceeds a document version threshold based on the first version and the second version;
determining that a frequency of the dialogue exceeds a frequency threshold based on the first duration and the second duration;
identifying a pre-defined usage pattern that exists prior to the dialogue based on the number of document versions in the dialogue exceeding the document version threshold and the frequency of the dialogue exceeding the frequency threshold;
identifying a second communication tool associated with the pre-defined usage pattern, wherein the first communication tool and the second communication tool are software applications;
informing the plurality of users of the second communication tool for a communication subsequent to the dialogue;
switching from the first communication tool to the second communication tool after informing the plurality of users; and
generating a summary of the communication subsequent to the dialogue.

15. The non-transitory computer readable storage medium of claim 14, wherein a subgroup of the plurality of users uses the second communication tool for the communication subsequent to the dialogue.

16. The non-transitory computer readable storage medium of claim 15, wherein the first communication tool is email, and wherein the second communication tool is instant messaging.

17. The non-transitory computer readable storage medium of claim 14, wherein the pre-defined usage pattern comprises a time delay pattern between messages in the dialogue.

18. The non-transitory computer readable storage medium of claim 14, wherein the pre-defined usage pattern comprises a document attachment pattern between messages in the dialogue.

19. The non-transitory computer readable storage medium of claim 14, wherein the instructions further comprising functionality for:
providing the summary comprising a filtered selection of messages to a user of the plurality of users.

20. The non-transitory computer readable storage medium of claim 19, wherein the summary is provided to the user during use of the first communication tool.

21. The non-transitory computer readable storage medium of claim 14, wherein subsequent to informing the plurality of users of the second communication tool:
a first user of the plurality of users communicates with a second user of the plurality of users using the first communication tool; and the first user of the plurality of users communicates with a third user of the plurality of users using the second communication tool.

22. The method of claim 1, further comprising:

identifying the first communication tool as email; and identifying the second communication tool as an online document sharing tool.

23. The system of claim 9, wherein the communication engine further comprises functionality to:

identify the first communication tool as email; and identify the second communication tool as an online document sharing tool.

24. The non-transitory computer readable storage medium of claim 14, the instructions further comprising functionality for:

identifying the first communication tool as email; and identifying the second communication tool as an online document sharing tool.

25. The method of claim 1, further comprising:

generating a duplicate dialogue by copying the dialogue from the first communication tool;

filtering the duplicate dialogue to generate a filtered selection of messages; and inserting the filtered selection of messages into the second communication tool prior to switching from the first communication tool to the second communication tool.

* * * * *